US010722788B2

(12) United States Patent
Ng et al.

(10) Patent No.: US 10,722,788 B2
(45) Date of Patent: Jul. 28, 2020

(54) SYSTEMS AND METHODS FOR MANAGING LATENCY IN NETWORKED COMPETITIVE MULTIPLAYER GAMING (71) Applicant: Allied Esports International, Inc., Irvine, CA (US)

(72) Inventors: Frank Ng, Irvine, CA (US); Jud Hannigan, Costa Mesa, CA (US); David Moon, Los Angeles, CA (US)

(73) Assignee: Allied Esports International, Inc., Irvine, CA (US)

( * ) Notice: Subject to any disclaimer, the term of this patent is extended or adjusted under 35 U.S.C. 154(b) by 0 days.

(21) Appl. No.: 16/170,599

(22) Filed: Oct. 25, 2018

(65) Prior Publication Data
US 2019/0118084 A1    Apr. 25, 2019

Related U.S. Application Data
(60) Provisional application No. 62/577,040, filed on Oct. 25, 2017.

(51) Int. Cl.
*A63F 13/358* (2014.01)
*A63F 13/335* (2014.01)
*A63F 13/352* (2014.01)
(52) U.S. Cl.
CPC .......... *A63F 13/335* (2014.09); *A63F 13/352* (2014.09); *A63F 13/358* (2014.09)
(58) Field of Classification Search
None
See application file for complete search history.

(56) References Cited

U.S. PATENT DOCUMENTS

| 2002/0142843 | A1* | 10/2002 | Roelofs | A63F 13/12 463/42 |
| 2006/0135258 | A1* | 6/2006 | Maheshwari | G07F 17/32 463/42 |
| 2014/0274415 | A1* | 9/2014 | Benzon | H04N 21/4781 463/42 |
| 2015/0209670 | A1* | 7/2015 | Furumoto | A63F 13/77 463/24 |
| 2015/0231492 | A1* | 8/2015 | Shah | A63F 13/22 463/31 |

* cited by examiner

*Primary Examiner* — Damon J Pierce
(74) *Attorney, Agent, or Firm* — Beem Patent Law Firm (57) ABSTRACT Systems for managing latency in networked competitive multiplayer gaming may include a latency management server that coordinates communications between game clients and game servers that enable a player to engage in a competitive multiplayer game, as well as other systems that balance the playing field, such as handicapping systems. Exemplary games may include, for example, first-person shooter games, real-time strategy games, fighting games, multiplayer online battle arena games, and the like. The latency management server may analyze network characteristics of the clients and servers and determine an appropriate server for each client or sets of clients. In some embodiments, the latency management server may add latency to particular communications to balance response times between all clients, provide a latency advantage to one or more clients, and the like. Scoring systems may implemented based on in-game actions, and scoring may be weighted based on latencies. Other implementations also are described.

9 Claims, 12 Drawing Sheets

SYSTEMS AND METHODS FOR MANAGING LATENCY IN NETWORKED COMPETITIVE MULTIPLAYER GAMING

CROSS-REFERENCE TO RELATED APPLICATIONS

This application also claims priority to U.S. Provisional Patent Application No. 62/577,040 filed Oct. 25, 2017, which is incorporated by reference in its entirety.

BACKGROUND OF THE INVENTION

1. Technical Field

This application is directed to the field of competitive gaming, and more particularly to managing latency in networked competitive multiplayer gaming.

2. Related Art

Electronic sports, also known as eSports, are a form of competitive video game competitions and entertainment that have been rapidly growing in popularity. For example, the recently completed International Dota 2 Championship tournament finals were played in front of a sold out crowd of nearly 20,000 in Seattle's Key Arena for an event purse over $20 million. By some estimates, the global eSports market will generate about $900 million in 2017 after generating about $500 million in 2016 and $325 million in 2015.

In a typical eSports competition, each player runs a game client that acts as an interface for the player. Player inputs are transmitted from the game clients to a game server that manages the game state (implementing functions such as physics, game rules and the like). The game server may update the game state based on the inputs received from the various game clients, and updates to the game state may then be transmitted back to the game clients, which re-renders the game to convey the updated state information to the player. This process of receiving input, updating the game state and rendering the updated game is known as the game loop. Typical game loops are completed about 30 or 60 times per second (every 33 milliseconds or 16 milliseconds) or more.

Because game state updates occur so frequently, network speed is crucial for high performance in today's eSports games. Differences of a tenth of a second or less can determine winners and losers. As such, the time latency inherent in one player accessing a game server half-way across the world versus an opponent situated in the same city as the server can create unfair playing fields between the players or teams competing in an event.

To compensate for latency, eSports competitions are generally held in a single location, such as an arena or convention center. However, this greatly limits eSports competitions, as it is difficult to frequently assemble top competitors in a single location. Moreover, latency issues still may persist even when all of the players are under a single roof.

Accordingly, a need has long existed for improved latency management systems, including systems for managing latency and handicapping in networked competitive multiplayer gaming.

SUMMARY

Disclosed herein are systems for managing latency in networked competitive multiplayer gaming that provide a game structure that builds in the latency of distance from the server as part of leveling the playing field between competing gamers. The systems may include a latency management server that coordinates communications between game client applications and game servers that enable a player to engage in a competitive multiplayer game, as well as other systems that level the playing field, such as handicapping systems. Exemplary competitive multiplayer games may include, for example, first-person shooter games, real-time strategy games, fighting games, multiplayer online battle arena games, and the like. The latency management server may analyze network characteristics of the game clients and servers and determine an appropriate server for each client or sets of clients. In some embodiments, the latency management server may add latency to particular communications. Latency may be added to balance response times between all clients and servers, provide a latency advantage to one or more clients, and the like. Scoring systems also may implemented based on in-game actions, and scoring may be weighted based on factors such as latencies.

Other systems, methods, features, and technical advantages of the invention will be apparent to one with skill in the art upon examination of the following figures and detailed description. It is intended that all such additional systems, methods, features, and technical advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION OF THE PREFERRED EMBODIMENTS

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the latency management system architecture may be stored on, distributed across, or read from other machine-readable media, for example, secondary storage devices such as hard disks, floppy disks, and CD-ROMs; a signal received from a network; other forms of ROM or RAM either currently known or later developed; and the like.

Furthermore, although specific components of the communications architecture will be described, methods, systems, and articles of manufacture consistent with the latency management system architecture may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways, including unstructured data. Programs may be parts of a single program, separate programs, or distributed across several memories and processors. Systems may be implemented in hardware, software, or a combination of hardware and software in one processing system or distributed across multiple processing systems. As another example, some or all of the functionality of the latency management server 40 may be incorporated into the game clients 20a-n, the game servers 50a-n, or both.

1.0 Latency Management System Overview

Figure 1:
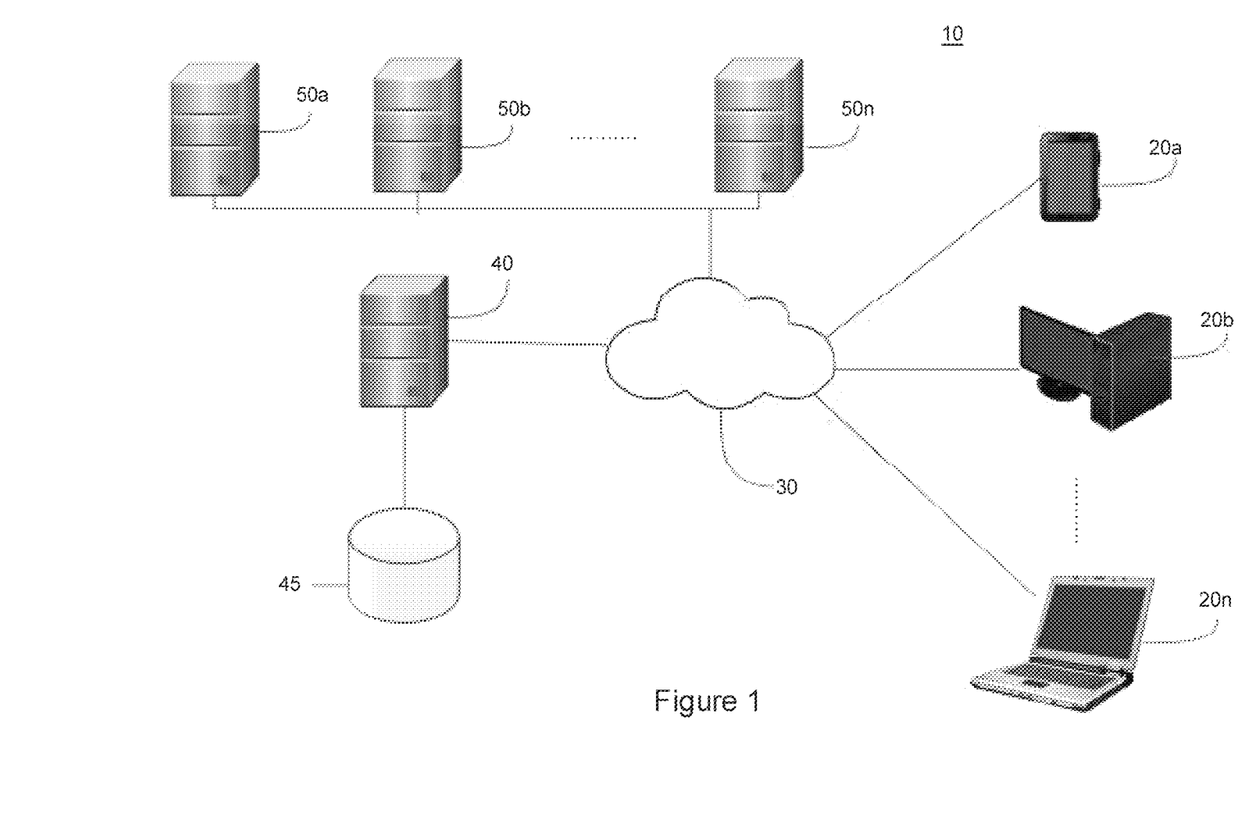
FIG. 1 shows an exemplary physical architecture for an exemplary system for managing latency in a networked competitive multiplayer competition.

As shown in FIG. 1, an exemplary architecture 10 for a system for managing latency in networked competitive multiplayer gaming is shown. One or more players at client devices may run game client applications 20a-n which may communicate with one or more game servers 50a-n to enable the players to participate in a networked competitive multiplayer game. The game client applications 20a-n and/or the game servers 50a-n may communicate with a latency management server 40 via a communications network 30. The game client applications 20a-n and/or servers 50a-n may communicate network connectivity data, game data, user profile data, and the like with the latency management server 40. The latency management server 40 may analyze the connectivity and/or game data and manage communications between the game clients 20a-n and game servers 50a-n based on the data. The latency management server 40 also may store information in one or more data storage devices 45.

The latency management server 40 may manage the latency between the game client applications 20a-n and the game servers 50a-n in a variety of ways. In some embodiments, the latency management server 40 may reduce and/or eliminate latency advantages or disadvantages across players in a game so that each player has approximately the same latency. This may be accomplished, for example, by determining the player with the highest latency and increasing the latency of the remaining players accordingly. Players may be notified if their latency is adjusted and, in some embodiments, the system may persistently display the latency of each player to the player and/or to other players. By managing the latency as disclosed herein, the latency management server 40 is able to eliminate the technical problem of needing all teams and/or players to be in the same physical location, greatly increasing competition opportunities. For example, teams may compete against one another from different venues, each of which may be customized to their liking, filled with their own fans, and the like.

Alternatively, or additionally, the latency management server 40 may control latency among players to provide an advantage to one or more players. For example, the latency management server 40 may create "home" and "away" teams, similar to traditional sports, in which one team may be given a "home team" advantage by providing lower latency for players on the team while the "away team" may compensate for higher latency. Other latency management methodologies also may be used.

In some embodiments, the latency management server 40 may manage latency individually for each player in a game. For example, each player may have an associated target latency. This may allow the latency management server 40 to customize the game for each player's skill level, such as providing low latency for new or lower skilled players and providing higher latency for higher skilled players, forcing the higher skill player to adjust their gameplay to compensate for the latency disadvantage. As another example, each game may have a target latency and each player's individual latency may be adjusted to match the game's target latency. Alternatively, or additionally, the latency management server 40 may manage overall team latency. As an example, each team may have a target latency and the latency management server 40 may manage latency so that each team's players match the target latency for the team. Other methodologies also may be used.

In still further embodiments, latency management server 40 also may implement data collection features, scoring features, and handicap features. The data collection features may track in-game actions, such as kills in a first person shooter game (FPS). The scoring features may assign point values to each tracked action (or some of the tracked actions). The scoring may be standard for each player, or may be weighted based on a variety of factors, such as latency, statistical differences, player skill, and the like. Handicapping features may include weighting scoring, adjusting latency based on the collected data, and the like.

Although references will now be made to specific components of the system performing specific features, it should be apparent to one of ordinary skill in the art that such references are exemplary and are not intended to limit the scope of the claims in any way; furthermore, the functionalities described herein may be implemented in a virtually unlimited number of configurations. For example, the server 40 may be implemented as a single server configured to provide all of the systems functionalities, or the functionalities may be implemented across multiple servers. As a specific example, although data collection features, scoring features and handicapping features are described as being performed by the latency management server 40, each of these features may be implement by separate hardware, each of which may include one or more servers and data storage mechanisms.

1.1 Exemplary Game Client Applications

Game client applications 20a-n may provide a user interface for the system and may communicate content selection information, user profile information, game data and other information with latency management server 40 via communications network 30. The game client applications 20a-n also may communicate with one another. In one embodiment, game client applications 20a-n may comprise stand-alone applications which may be either platform dependent or platform independent. For example, game client applications 20a-n may be stand-alone applications for a mobile phone configured to run on a mobile operating system such as the iOS™ operating system from Apple Inc. located in Cupertino, Calif., the Android™ operating system from Google, Inc. located in Mountain View, Calif., or the like. Alternatively, or additionally, client applications 20a-n may connect to the game servers 50a-n via the Internet using a standard browser application. Alternatively, or additionally, one or more of the game client applications 20a-n may be an application configured to run on a mobile computer such as a laptop computer, handheld computer, tablet, mobile messaging device, gaming system or the like which may all utilize different hardware and/or software packages. Other methods may be used to implement the client devices 20a-n.

1.2 Exemplary Communications Networks 30

Communications network 30 may be any type of private or public communication network, such as the Internet, and may include one or more communications networks. In some embodiments, the communications network 30 may be a cellular network such as, for example, a Code Division Multiple Access (CDMA) network, Global System for Mobiles (GSM) network, General Packet Radio Service (GPRS) network, cdmaOne network, CDMA2000 network, Evolution-Data Optimized (EV-DO) network, Enhanced Data Rates for GSM Evolution (EDGE) network, Universal Mobile Telecommunications System (UMTS) network, Digital Enhanced Cordless Telecommunications (DECT) network, Digital AMPS (IS-136/TDMA), Integrated Digital Enhanced Network (iDEN), Long-Term Evolution (LTE) and the like.

1.3 Exemplary Latency Management Server 40

Latency management server 40 may receive network connectivity data, game data, user profile information and the like from the game clients 20a-n and game servers 50a-n, may store the some or all of the same in a data storage device 45, and the like. As should be apparent to one of ordinary skill in the art from the disclosure herein, other related services may also be provided.

1.4 Exemplary Data Storage Device 45

Data storage device 45 may store a variety of information, including user profile information, user preference information, content data, and the like. Although illustrated as a database, the specific storage mechanism implemented by data storage device 45 may take a variety of forms, such as one or more instances of a Heroku Dyno hosted on the Heroku platform, utilizing one or more of the following storage mechanisms: Amazon Simple Storage Service™ (Amazon S3™) Dropbox (via API integration), PostgreSQL relational database system, queuing services such as Amazon Simple Queue Service™ (Amazon SQS™) or alternatives such as RabbitMQ, Redis, Sidekiq, or cron; and/or other storage mechanisms. Other technologies also may be used. In some embodiments, all information stored in the data storage device 45 is encrypted.

1.5 Exemplary Game Servers 50a-n

Game servers 50a-n may host games played by players using the game clients 20a-n, calculate some or all game updates, communicate network connectivity data, game data, user profile information and the like with the game clients 20a-n and/or the latency management server 40, and the like. Other functionality also may be implemented by game servers 50a-n. In some embodiments, game servers 50a-n and latency management server 40 may be owned by different entities.

2.0 Exemplary eSports Event Latency Management

Although reference will now be made to certain embodiments described herein with reference to eSports competitions, the principles presented herein may be used for other networked completive multiplayer games and the like. The embodiments illustrated herein should therefore not be interpreted to be exclusive or limiting, but rather exemplary or illustrative.

2.1 Exemplary Latency Management By Funneling Network Traffic Through Latency Management Server 40

Figure 2A:
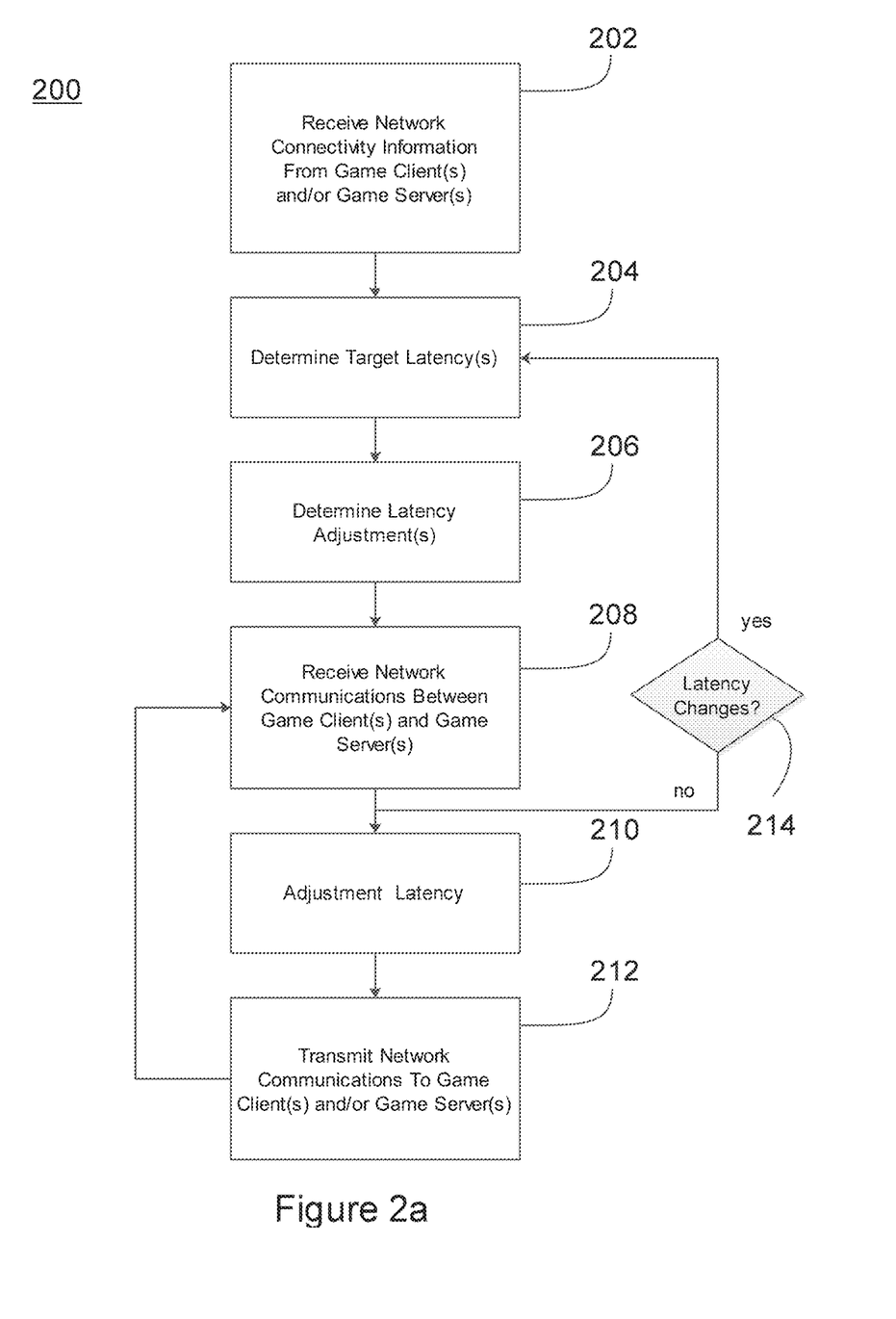
FIGS. 2a and 2b and 2c show exemplary flow charts for managing latency in a networked competitive multiplayer competition.
Figure 3A:
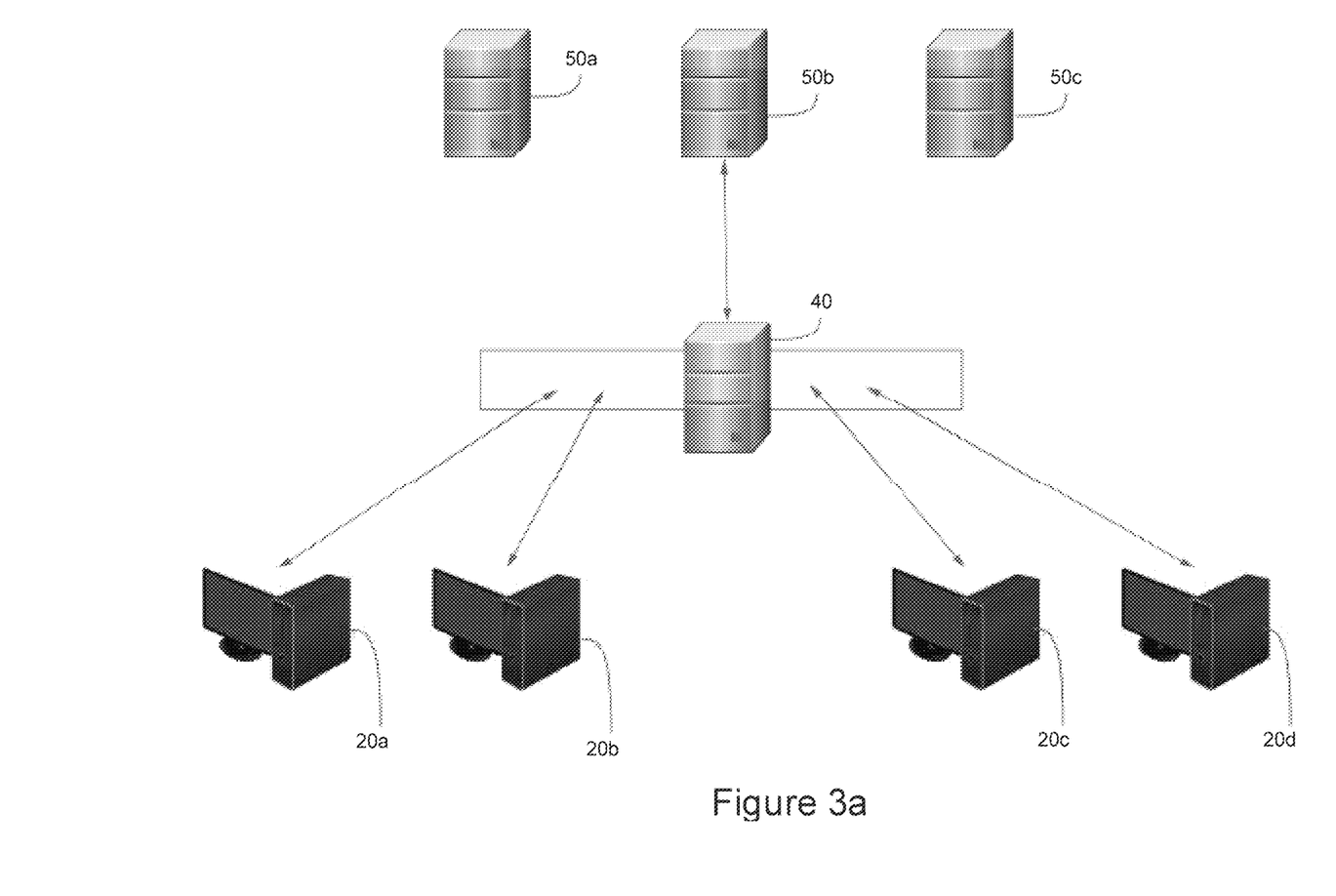
FIGS. 3a-f show exemplary network connections between elements of a physical architecture for managing latency in a networked competitive multiplayer competition.
Figure 3B:
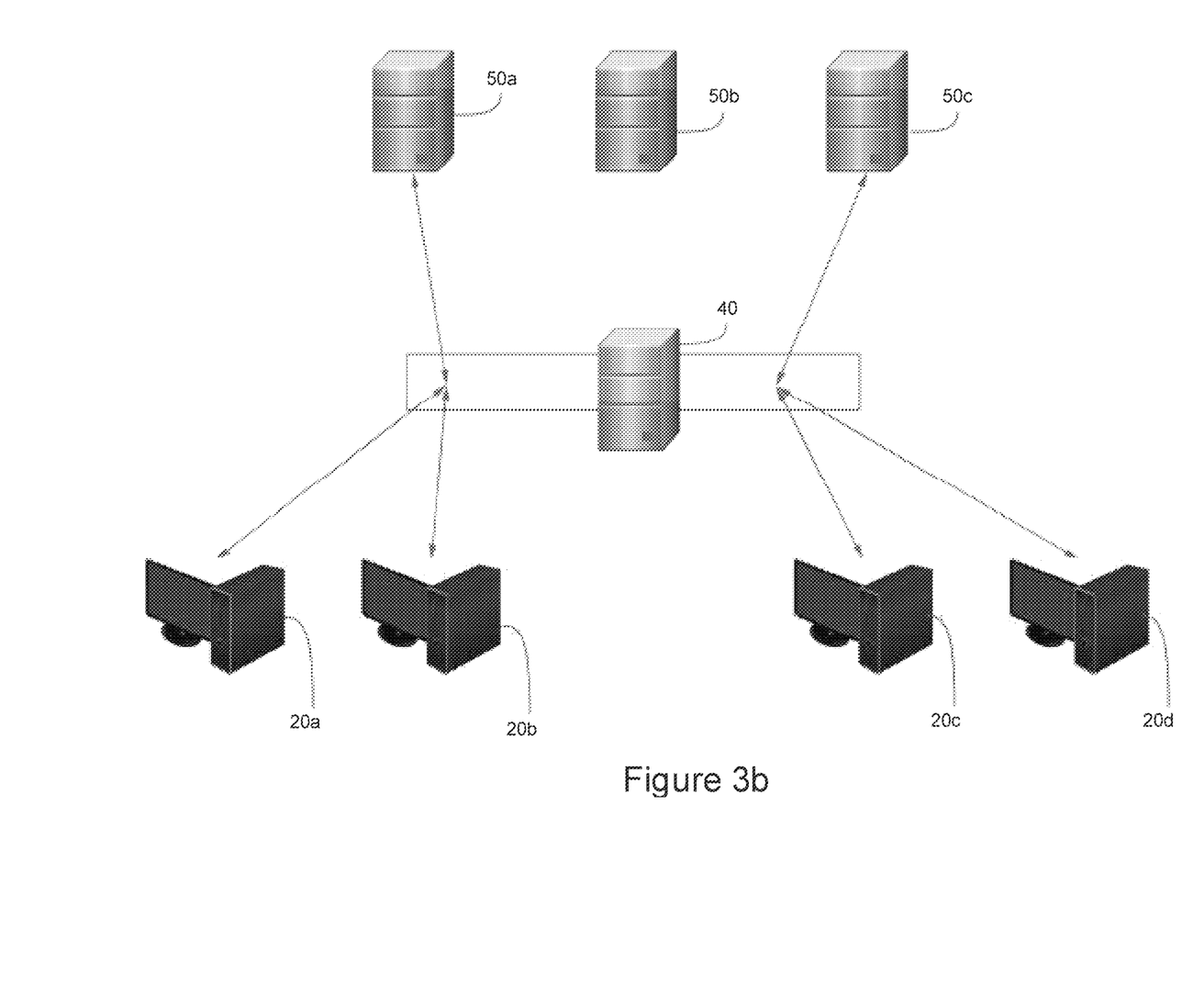
Figure 3C:
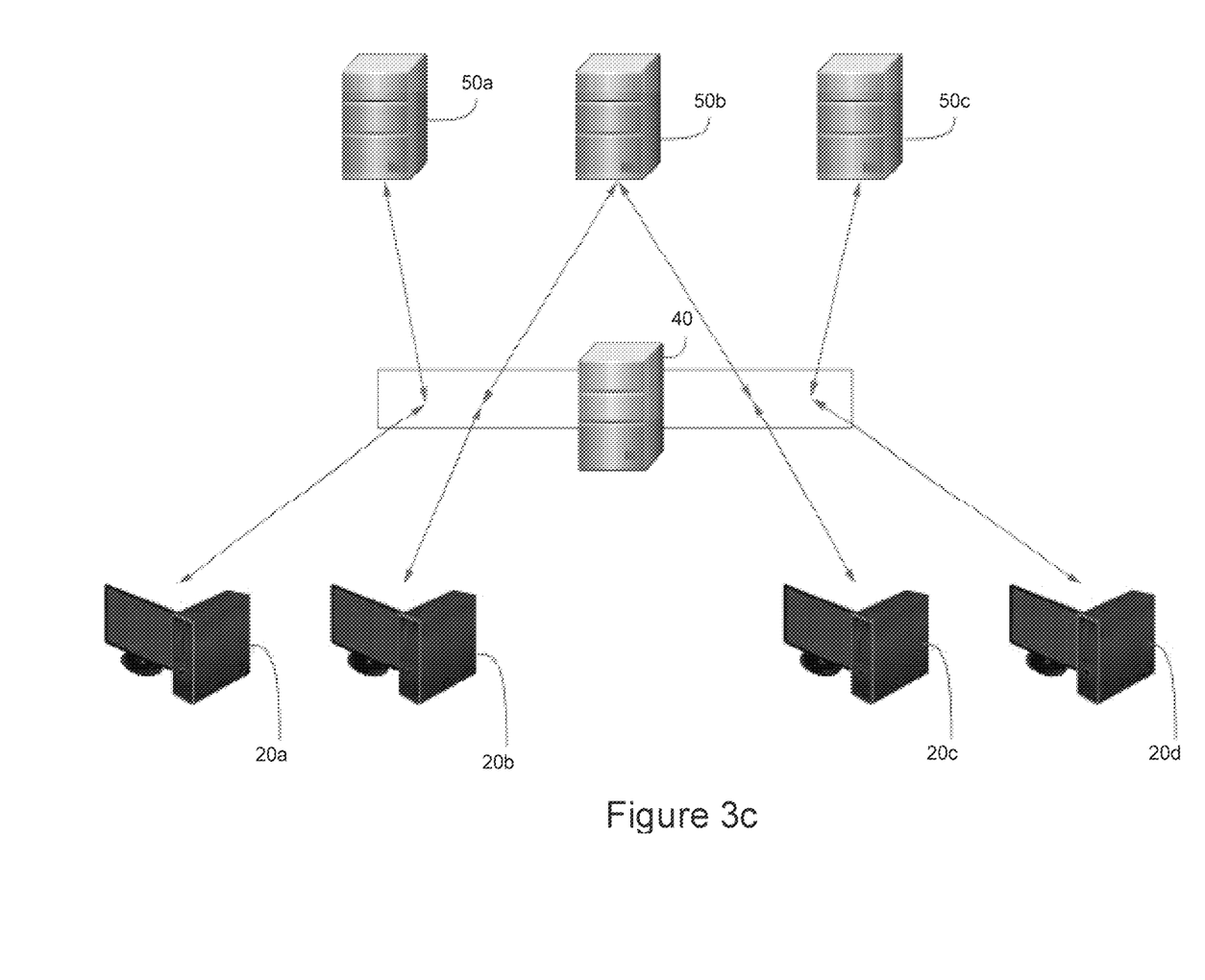

Referring to FIG. 2a, an exemplary flow chart for a process 200 for managing latency in a networked competitive multiplayer competition is shown. In the exemplary process 200 shown in FIG. 2a, network communications between the game clients 20a-n and the game servers 50a-n is funneled through the latency management server 40. In other words, the game clients 20a-n and the game servers 50a-n do not communicate directly, but instead communicate through the latency management server 40. The latency management server 40 may (1) route all traffic from the game clients 20a-n to a single server 50a (as shown in FIG. 3a), (2) route all traffic from a group of game clients 20a-n (team one) to a single server 50a and all traffic from a second group of game clients 20a-n to another server 50b (team two) (as shown in FIG. 3b), (3) route traffic from individual game clients 20a-n to individual servers 50a-n (as shown in FIG. 3c), and the like. Other architectures also may be used.

Initially, the latency management server 40 may receive network connectivity information from the game client applications 20a-n and/or the game servers 50 at step 202. Alternatively, or additionally, the server 40 may receive geographic distance information between the game clients 20a-n and the game servers 50a-n, as distance may correlate with network response times in some cases. For example, the latency management server 40 may receive latency information between a game client 20a and one or more servers 50a-n. As another example, the latency management server 40 may receive information about response times, also referred to as ping times or ping information, between the game clients 20a-n and the latency management server 40 as well as ping information between the game servers 50a-n and the latency management server 40. Table 1.0 below shows an exemplary set of latency information indicating ping times between four client applications 20a-d and the latency management server 40.

TABLE 1.0

| Exemplary Ping Times - Client 20a-d to Server 40 ||
| Client Name | Latency Management Server 40 |
| --- | --- |
| Client 20a | 100 ms |
| Client 20b | 50 ms |
| Client 20c | 10 ms |
| Client 20d | 50 ms |

Next, the latency management server 40 may determine one or more target latencies at step 204. As noted above, a target latency may be set in many ways. For example, a single target latency may be set for all players in the game and each individual player's latency may be adjusted accordingly. The target latency may be set by determining the fastest of the slowest response times for each client. For example, using the exemplary ping times shown in Table 1.0, the latency management server 40 may determine a target latency of 100 ms because each client 20a-n is able to achieve a response time to the latency management server 40 of 100 ms or faster. Other methodologies also may be used.

Next, the latency management server 40 may determine latency adjustments at step 206. Latency adjustments may be additional time (or wait times) added to communications between particular clients 20a-n and game server 50b, such as additional time to make the latency between a particular game client 20a and a particular server 50b equal to the target latency. In the example set forth in Table 1.0 and a target latency of 100 ms, the latency management server 40 may determine a latency adjustment of 50 ms for client 20*b*, 90 ms for client 20*c*, 50 ms for client 20*d*, and no latency adjustment for client 20*a*. Other methodologies may be applied to determine latency adjustments.

During gameplay, the latency management server 40 may receive network communication from the game clients 20*a-n* and the game servers 50*a-n* at step 208, such as player inputs from game clients 20*a-n* and game state updates from the game servers 50*a-n*. The server 40 may apply any latency adjustments to the communications at step 210 and transmit the communication to the appropriate game client 20*a-n* or game server 50*a-n* at step 212.

The server 40 also may continue to monitor network connectivity and determine if latency has changed at step 214, and, if so, may recalculate target latency(ies) and latency adjustment(s) at steps 204 and 206. Target latency (ies) and/or latency adjustment(s) may be updated periodically, such as once every game, once every set of games, at certain set points within a game, continuously within a game, and the like. In some embodiments, updated target latency(ies) and/or latency adjustment(s) may only be determined if the change in latency is more than a predetermined threshold. Exemplary thresholds may be between about 1 ms and about 100 ms, preferably between about 5 ms and about 50 ms, more preferably between about 5 ms and about 25 ms and in some embodiments about 10 ms. Referring again to the example shown in Table 1.0, updated target latency(ies) and latency adjustment(s) may be determined if the ping time between game client 20*a* and game server 50*b* increases to 125 ms.

As noted above, in some embodiments target latency(ies) and latency adjustments may be applied to provide an advantage to a particular player or team in a game. The "advantage" may be either positive or negative, i.e. an increase or decrease in latency for a particular player or team, depending on the particular game. For example, in first person shooter games (FPS) such as COUNTER STRIKE: GLOBAL OFFENSIVE provided by Valve Corporation of Bellevue, Wash., a player with longer latency times may have an advantage over a player with shorter latency times.

In some embodiments, a "home team" or "home field" latency advantage may be provided for a particular team of players. Exemplary latency advantages may be between about 1 ms and about 500 ms, preferably between about 5 ms and about 100 ms, even more preferably between about 10 ms and about 50 ms and in some embodiments about 25 ms. Other values also may be used.

In some embodiments, two teams may compete against one another in a series of games, such as a best-of-seven series. Latency may be adjusted differently for each game in the series. For example, latency advantages may be provided to teams in alternating games, so that team 1 has a "home" game with a latency advantage in games 1, 3, 5 and 7 in the series while and team 2 is provided a latency advantage in games 2, 4 and 6. Other series formats, such as a 2-2-1-1-1 format, a 2-3-2 format, and the like also may be used.

The latency advantage may be the same in each of the games, such as a 30 ms advantage for the "home" team, or may vary from game to game. For example, latency advantages may be larger in the first game or games and may be smaller in later games in the series. In some embodiments, latency advantages may be progressively smaller for each "home" game for the team such that each team's first "home" game has a first latency advantage, each team's second "home" game has second latency advantage, and so on. In some embodiments, a series may include "neutral site" games in which neither team is provided a latency advantage, such as game seven of a seven game series.

2.2 Exemplary Latency Management By Pairing Specific Game Clients 20*a-n* With Specific Game Servers 50*a-n*

Figure 2B:
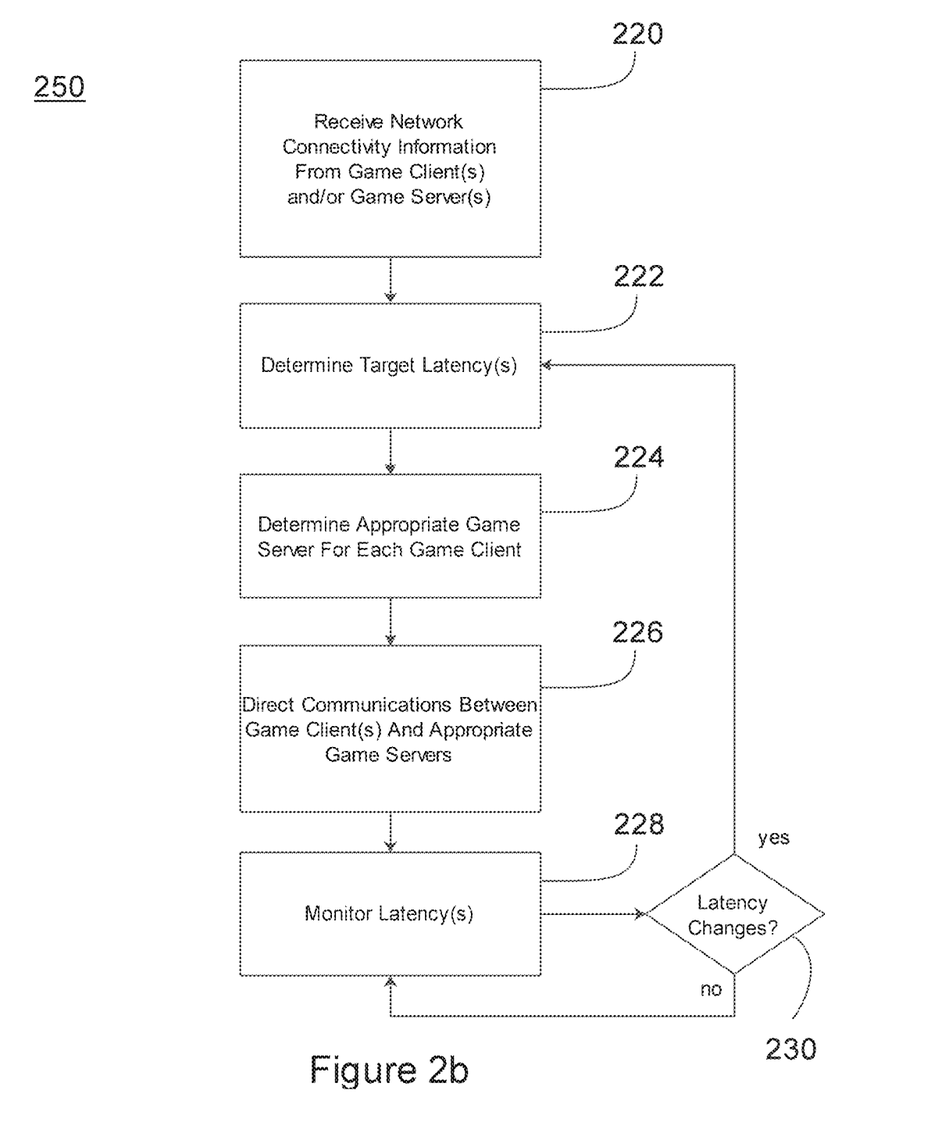
Figure 3D:
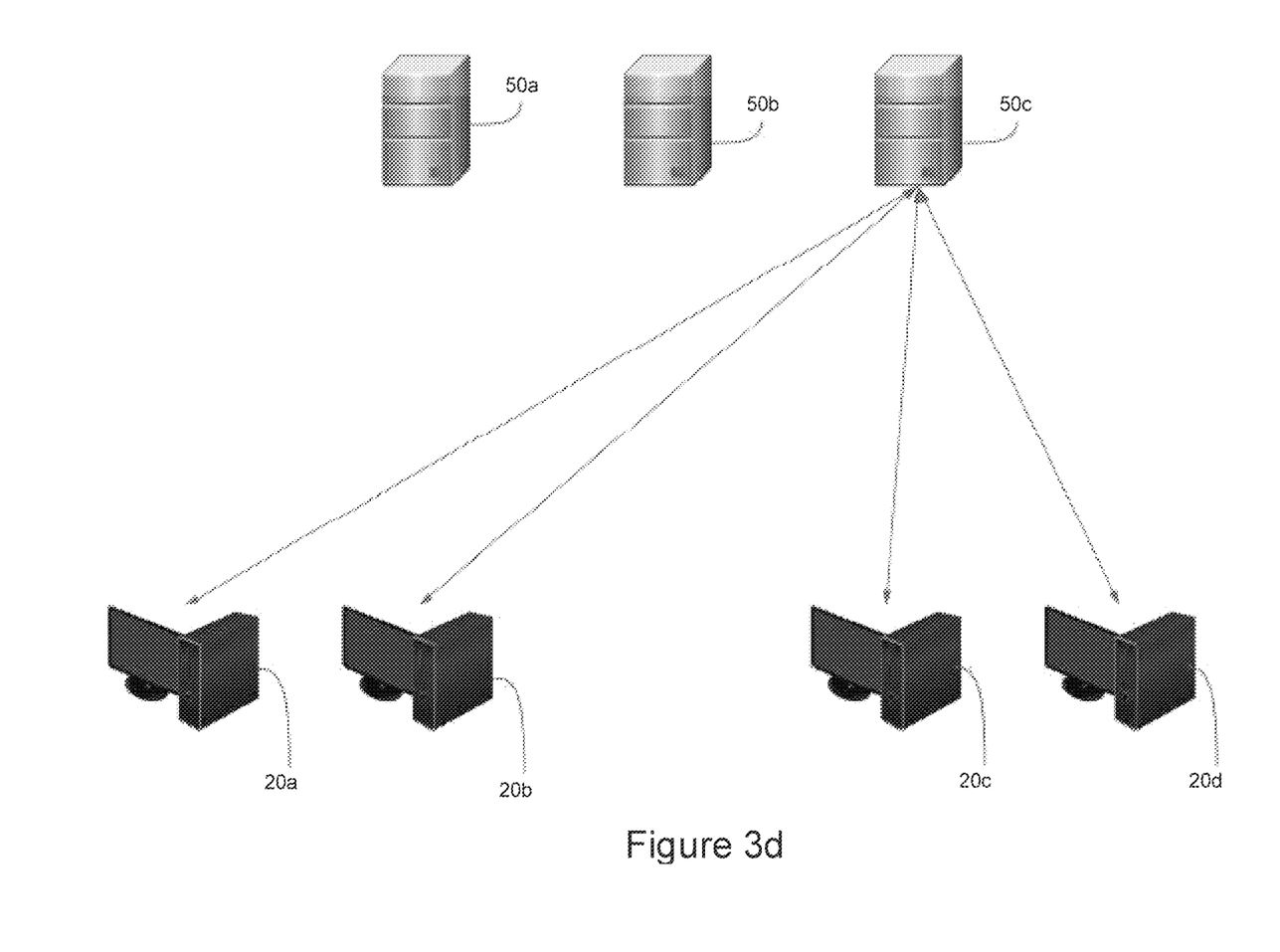
Figure 3E:
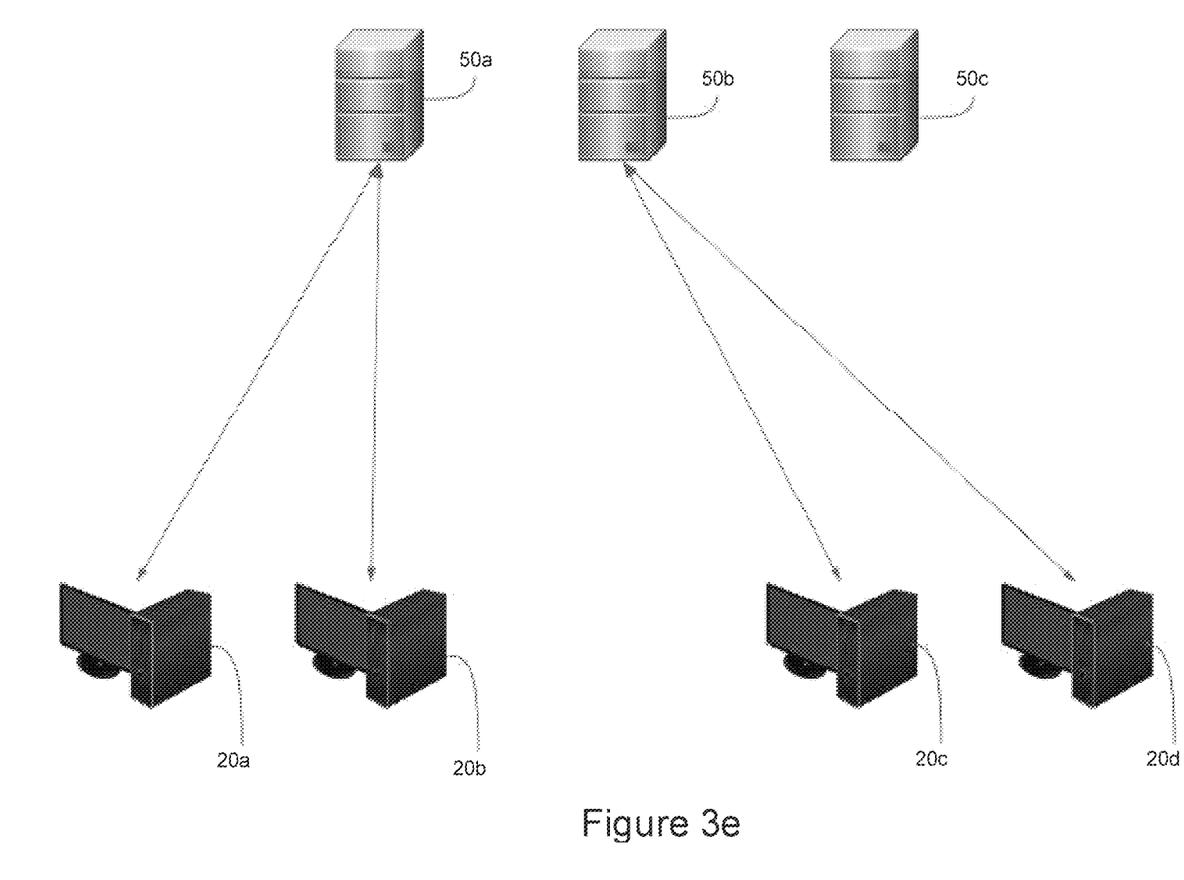
Figure 3F:
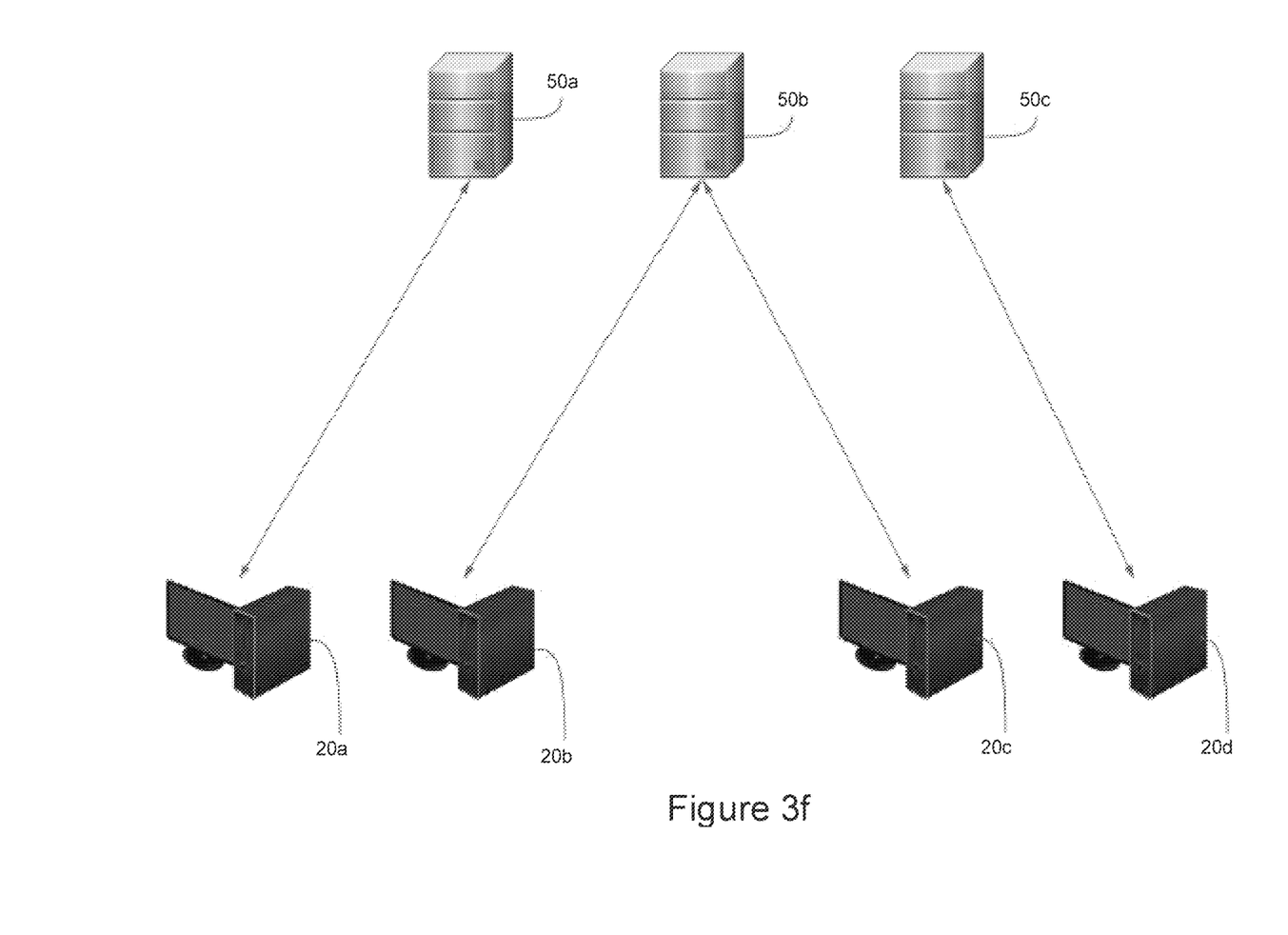

Referring to FIG. 2*b*, another exemplary flow chart for a process 250 for managing latency in a networked competitive multiplayer competition is shown. In the exemplary process 250, the game clients 20*a-n* communicate directly with game servers 50*a-n* that are assigned by the latency management server 40. Once again, the latency management server 40 may (1) route all traffic from the game clients 20*a-n* to a single server 50*a* (as shown in FIG. 3*d*), (2) route all traffic from a group of game clients 20*a-n* (team one) to a single server 50*a* and all traffic from a second group of game clients 20*a-n* to another server 50*b* (team two) (as shown in FIG. 3*e*), (3) route traffic from individual game clients 20*a-n* to individual servers 50*a-n* (as shown in FIG. 3*f*), and the like. Other architectures also may be used.

Initially, the latency management server 40 may receive network connectivity information from the game client applications 20*a-n* and/or the game servers 50 at step 220. Alternatively, or additionally, the server 40 may receive geographic distance information between the game clients 20*a-n* and the game servers 50*a-n*, as distance may correlate with network response times in some cases. For example, the latency management server 40 may receive latency information between a game client 20*a* and one or more servers 50*a-n*. As another example, the latency management server 40 may receive ping information between the game clients 20*a-n* and the latency management server 40 as well as ping information between the game servers 50*a-n* and the latency management server 40. Table 2.0 below shows an exemplary set of latency information indicating ping times between four client applications 20*a-d* and two game servers 50*a-b*.

TABLE 2.0

Exemplary Ping Times - Client to Server

| Client Name | Server 50a | Server 50b | Server 50c |
|---|---|---|---|
| Client 20a | 10 ms | 100 ms | 160 ms |
| Client 20b | 10 ms | 50 ms | 165 ms |
| Client 20c | 100 ms | 10 ms | 170 ms |
| Client 20d | 200 ms | 50 ms | 155 ms |

Next, the latency management server 40 may determine one or more target latencies at step 222. As noted above, a target latency may be set in many ways. For example, a single target latency may be set for all players in the game and each individual player's latency may be adjusted accordingly. The target latency may be set by determining the fastest of the slowest response times for each client. For example, using the exemplary ping times shown in Table 2.0, the latency management server 40 may determine a target latency of 100 ms because each client 20*a-n* is able to achieve a response time to game server 50*b* of 100 ms or faster. Alternatively, or additionally, the server 40 may select a target time based on the slowest of the fastest times achievable by a given client 20*a-n*. Again referring to the example in Table 2.0, the server 40 may select a target latency of 50 ms because all of the clients 20*a-n* may achieve a response time of 50 ms or less with at least one of the servers 50*a-b*.

As noted above, a target latency may be set in many ways. For example, a single target latency may be set for all players in the game. The target latency may be set, for example, by determining the fastest of the slowest response times for each client 20*a-n* among the servers 50*a-n*. For example, using the exemplary ping times shown in Table 2.0, the latency management server 40 may determine a target latency of 100 ms because each client 20*a-n* is able to achieve a response time to game server 50*b* of 100 ms or faster. Alternatively, or additionally, the server 40 may select a target time based on the slowest of the fastest times achievable by a given client 20*a-n*. Again referring to the example in Table 2.0, the server 40 may select a target latency of 50 ms because all of the clients 20*a-n* may achieve a response time of 50 ms or less with at least one of the server 50*a*-50*b*.

Next, the latency management server 40 may determine appropriate servers 50*a-n* for particular game clients 20*a-n* at step 224 and direct communications to occur over those channels at step 226. Servers 50*a-n* may be selected so that each client 20*a-n* has a response time with the selected server 50*a-n* about the same as the target latency. In the example set forth in Table 2.0, the latency management server 40 may determine that clients 20*a* and 20*b* (team one) communicate with server 50*a* and that clients 20*c* and 20*d* (team two) communicate with server 50*b*.

As another example, the target latency may be set by determining the server 50*a-n* that has the nearest response times for all players. Referring to the example shown in Table 2.0, the latency management server 40 may select game server 50*c* because each of the client applications 20*a-n* have similar response times. Other methodologies may be applied to determine latency adjustments.

During gameplay, the latency management server 40 may continue to monitor latency at step 228 and determine if latency has changed at step 230, and, if so, may recalculate target latency(ies) and server selections at step 222 and 224. Target latency(ies) and/or latency adjustment(s) may be updated periodically, such as once every game, once every set of games, at certain set points within a game, continuously within a game, and the like. In some embodiments, updated target latency(ies) and/or latency adjustment(s) may only be determined if the change in latency is more than a predetermined threshold. Exemplary thresholds may be between about 1 ms and about 100 ms, preferably between about 5 ms and about 50 ms, more preferably between about 5 ms and about 25 ms and in some embodiments about 10 ms. Referring again to the example shown in Table 2.0, updated target latency(ies) and latency adjustment(s) may be determined if the ping time between game client 20*a* and game server 50*b* increases to 125 ms.

Figure 2C:
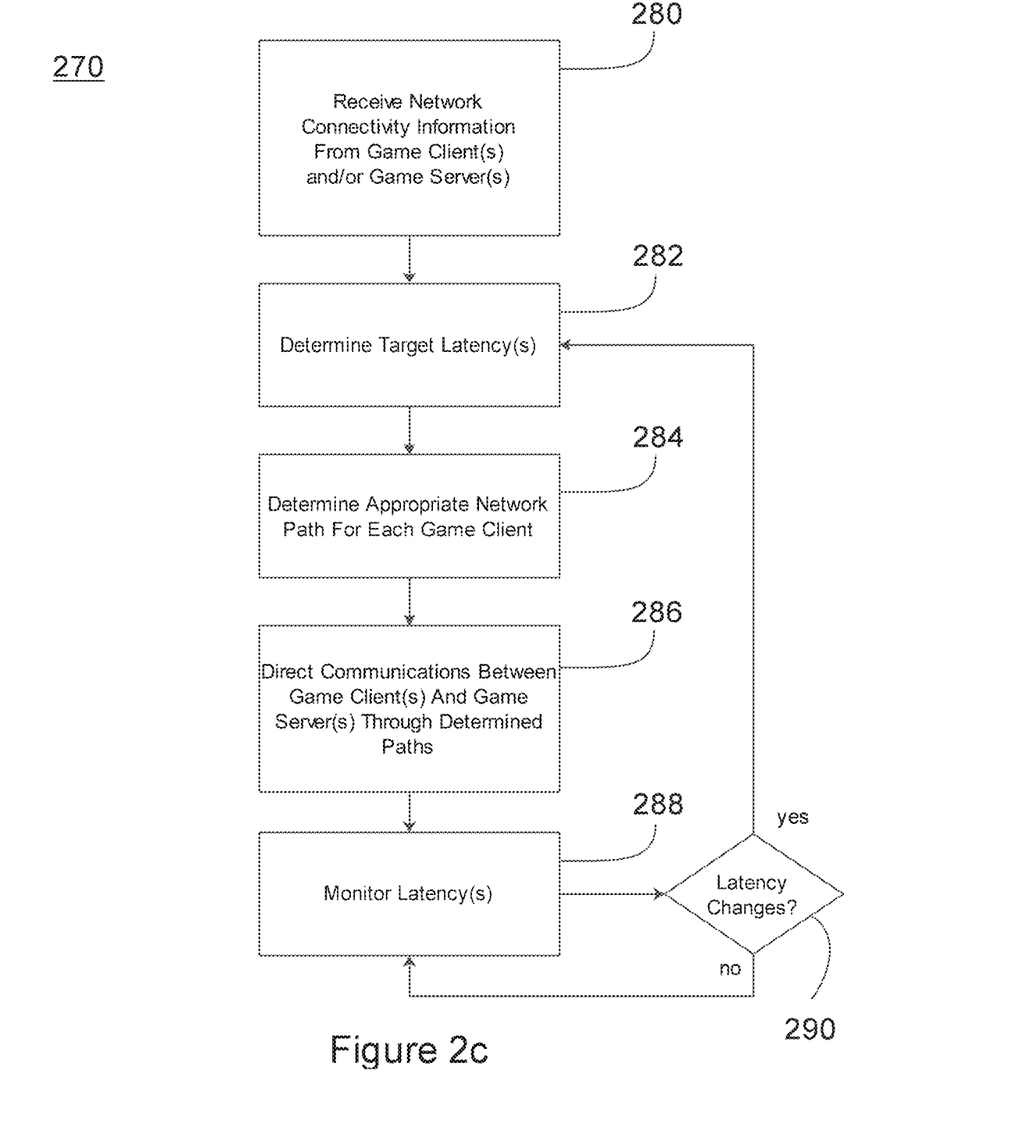

2.3 Exemplary Latency Management by Routing Network Communications Between Game Clients 20*a-n* with Specific Game Servers 50*a-n* Using Predetermined Number of Hops Referring to FIG. 2*c*, another exemplary flow chart for a process 270 for managing latency in a networked competitive multiplayer competition is shown. In the exemplary process 270, the game clients 20*a-n* communicate with one or more game servers 50*a-n* by going through network communication paths that are assigned by the latency management server 40. Once again, the latency management server 40 may (1) route all traffic from the game clients 20*a-n* to a single server 50*a* (as shown in FIG. 3*d*), (2) route all traffic from a group of game clients 20*a-n* (team one) to a single server 50*a* and all traffic from a second group of game clients 20*a-n* to another server 50*b* (team two) (as shown in FIG. 3*e*), (3) route traffic from individual game clients 20*a-n* to individual servers 50*a-n* (as shown in FIG. 3*f*), and the like. Other architectures also may be used. In these embodiments, one or more network communication devices 60*a-l* may be used as intermediate communication nodes between the game clients 20*a-n* and the game servers 50*a-n* to shape the latency of each player. In other words, communications between the clients 20*a-n* and the servers 50*a-n* may hop from node to node to introduce delay in the communications. Network communications devices 60*a-l* may be any of a variety of devices for communicating over a network, such as relays, switches, servers and the like, or groups of such devices.

Initially, the latency management server 40 may receive network connectivity information from the game client applications 20*a-n* and/or the game servers 50 at step 280. Alternatively, or additionally, the server 40 may receive geographic distance information between the game clients 20*a-n* and the game servers 50*a-n*, as distance may correlate with network response times in some cases. For example, the latency management server 40 may receive latency information between a game client 20*a* and one or more servers 50*a-n*. As another example, the latency management server 40 may receive ping information between the game clients 20*a-n* and the latency management server 40 as well as ping information between the game servers 50*a-n* and the latency management server 40. Table 3.0 below shows an exemplary set of latency information indicating ping times between four client applications 20*a-d* and two game servers 50*a-b*.

TABLE 3.0

| Exemplary Ping Times - Client to Server | |
|---|---|
| Client Name | Server 50a |
| Client 20a | 10 ms |
| Client 20b | 100 ms |

Next, the latency management server 40 may determine one or more target latencies at step 282. As noted above, a target latency may be set in many ways. For example, a single target latency may be set for all players in the game and each individual player's latency may be adjusted accordingly. The target latency may be set by determining the fastest of the slowest response times for each client. For example, using the exemplary ping times shown in Table 3.0, the latency management server 40 may determine a target latency of 100 ms because each client 20*a-b* is able to achieve a response time to game server 50*a* of 100 ms or faster. Alternatively, or additionally, the server 40 may select a target time based on other factors and using other methodologies.

Figure 4:
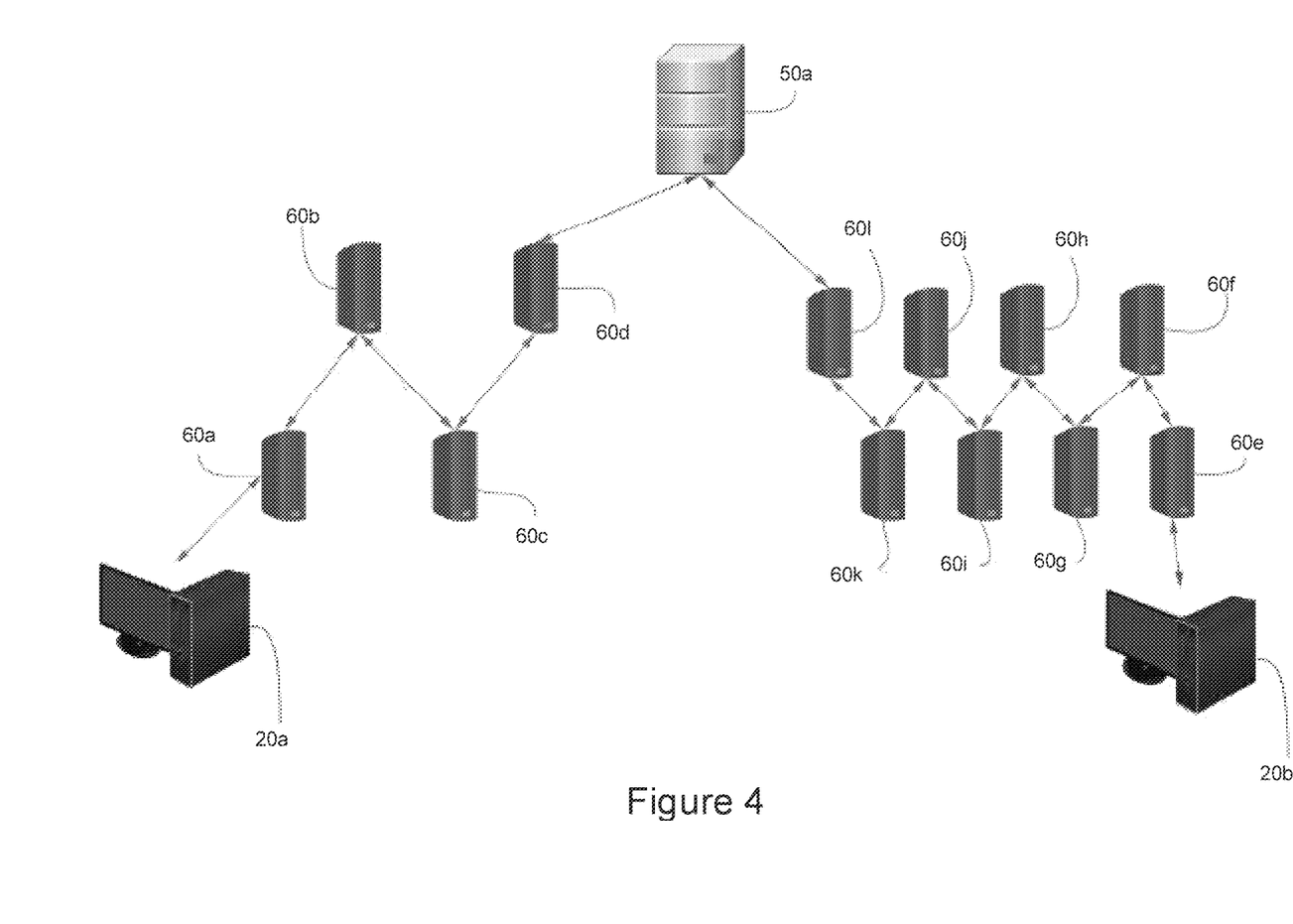
FIG. 4 shows another diagram of exemplary network connections between elements of a physical architecture for managing latency in a networked competitive multiplayer competition.

Next, the latency management server 40 may determine appropriate servers 50*a-n* and/or network paths for particular game clients 20*a-n* at step 284 and direct communications to occur over those channels at step 286. Servers 50*a-n* and/or network path(s) may be selected so that each client 20*a-n* has a response time with the selected server 50*a-n* about the same as the target latency. In the example set forth in Table 3.0, and as illustrated in FIG. 4, the latency management server 40 may determine that client 20*a* (team one) communicates with server 50*a* through intermediate nodes 60*a-d* and that client 20*b* (team two) communicates with server 50*a* through nodes 60*e*-601. In this manner, latency between the game clients 20*a* and 20*b* may be managed.

During gameplay, the latency management server 40 may continue to monitor latency at step 288 and determine if latency has changed at step 290, and, if so, may recalculate target latency(ies) and server/path selections at step 282 and 284. Target latency(ies) and/or latency adjustment(s) may be updated periodically, such as once every game, once every set of games, at certain set points within a game, continuously within a game, and the like. In some embodiments, updated target latency(ies) and/or latency adjustment(s)/path(s) may only be determined if the change in latency is more than a predetermined threshold. Exemplary thresholds may be between about 1 ms and about 100 ms, preferably between about 5 ms and about 100 ms, more preferably between about 5 ms and about 50 ms, even more preferably between about 5 ms and about 25 ms, further more preferable between 5 ms and 15 ms, and in some embodiments about 10 ms. Referring again to the example shown in Table 1.0, updated target latency(ies) and latency adjustment(s) may be determined if the ping time between game client 20*a* and game server 50*b* increase to 125 ms.

3.0 Exemplary Data Collection and Scoring Systems

Figure 5:
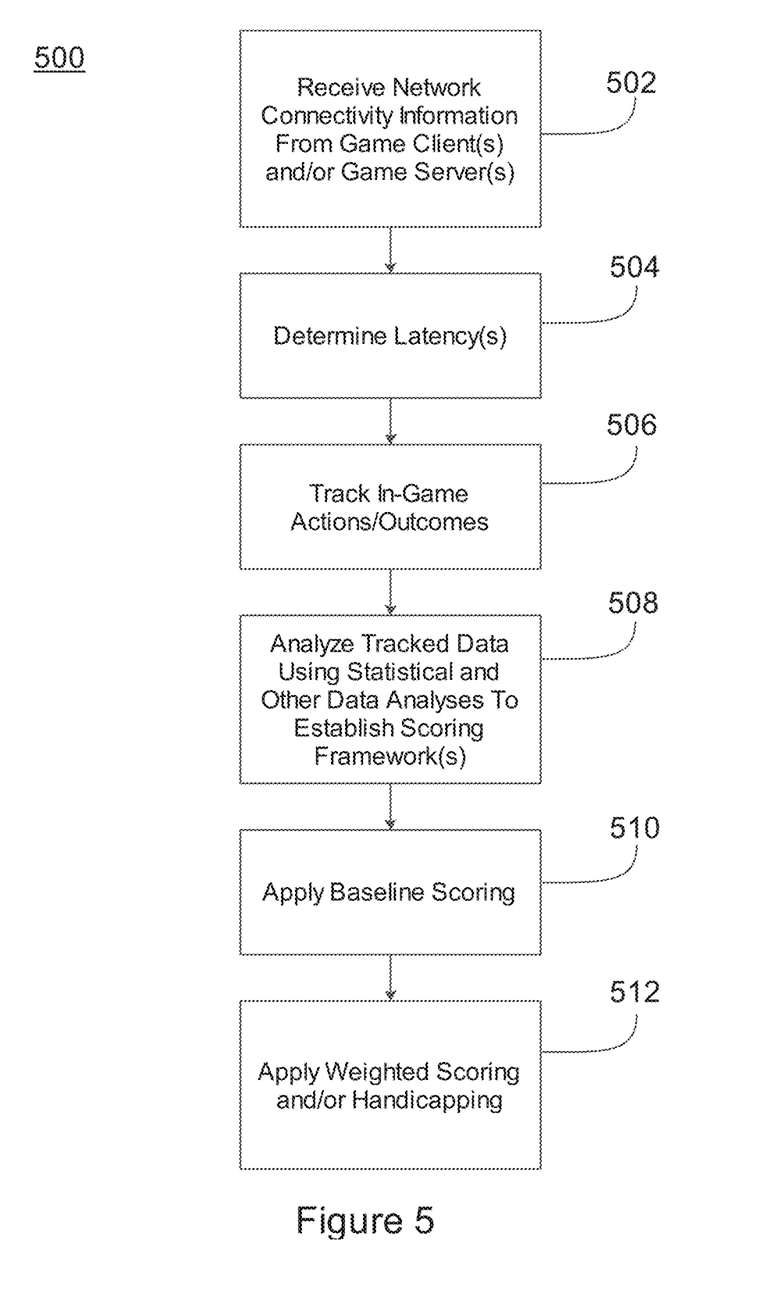
FIG. 5 shows another exemplary flow for managing latency

Referring to FIG. 5, a flow chart for an exemplary process 500 for collecting in-game data in a networked competitive multiplayer game and implementing data collection features, scoring features and/or handicapping features is shown. In the exemplary process 500, the game clients 20*a-n* may communicate with one or more game servers 50*a-n* to play a particular game. Latency between the game clients 20*a-n* and game servers 50*a-n* also may be determined and/or managed as described above. Alternatively, or additionally, latency may be managed solely through a weighted scoring feature, or through a combination of the methods described above and a weighted scoring feature.

At step 502, the latency management server 40 may receive network communications between the game client(s) 20*a-n* and game server(s) 50*a-n*, as described above. The network communications may include gameplay data, latency data (ping rates and the like), or both. In some embodiments, the latency management server may determine latencies for each of the game clients 20*a-n* at step 504.

At step 506, the latency management server 40 may track in-game actions and outcomes of the players. The in-game actions may be gameplay related actions, such as, for an FPS, kills, headshots, kill streaks, multi-kills, wins, damage, ability usage/kills, in-game objectives, kills with specific weapons, and the like. Other in-game actions also may be tracked. The tracked actions may be the same actions that are used for in-game scoring, or may be actions that are not used for in-game scoring. For example, an objective based game may require players to capture a specific zone or perform other in-game actions to win the round or game. In such a game, kills, headshots and other actions that do not directly determine the outcome of the game may be tracked in addition to those actions that directly determine the outcome of the game. The tracked actions may be stored in data storage device 45 or other storage mechanisms.

In some embodiments, the tracked actions may be used as part of a scoring system, a handicapping system, or both. For example, at step 508, the system may use statistics and/or other data analysis methods (such as ELO rating systems and the like) to establish a baseline scoring framework across actions/outcomes, as well as weighting coefficients to be applied to the scoring framework in some embodiments. Alternatively, or additionally, the baseline scoring and/or weighted coefficients may be determined manually.

A baseline scoring may be a scoring framework that is applied equally to all players (i.e. non-weighted scoring). For example, each headshot (or other precision hit) may be assigned 100 points, each kill may be assigned 1000 points, wins 5000 points, and the like. Other values also may be used. Points for each player may be totaled and a winner/winning team may be determined based on the scoring, regardless of the objective of a particular game. A baseline scoring framework may be applied to the tracked data at step 510.

In some embodiments, weighted scoring and/or handicapping features may be applied at step 512. Weighted scoring may include applying one or more scoring coefficients to the baseline scoring framework. Scoring coefficients may be based on a variety of factors, such as latency, modeled using statistical baselines and differences from the data collection system, and the like. For example, in a game in which a first player is determined to have a 50 ms response time and a second player having a 100 ms response time, the second player's baseline score may be multiplied by a coefficient to accommodate the latency difference, such as such as a coefficient between about 1.05 and about 2.0, preferably between about 1.2 and about 1.7, and in some embodiments about 1.5. In other words, in this example, the first player may receive 100 points for a headshot while the second player may receive 150 points for a headshot. Other coefficients also may be used.

Latency-based scoring coefficients may be applied regardless of whether latency is managed by the latency management server 40 as described above in section 2. In other words, latency management server 40 may manage latency directly by establishing target latencies or directing server usage (as described above), by manipulating scoring based on latencies, or both.

Handicapping features also may be implemented by the server 40 at step 510. Handicapping features may include weighting scoring, as described above. Alternatively, or additionally, handicapping features may include determining target latency based on the collected data, scoring averages, player skill assessment based on tracked in-game actions, and the like. For example, players that average a high number of kills per game, headshot percentages, or the like may be determined to be higher skill than other players and scoring coefficients or latency may be adjusted accordingly to balance matches against lower skilled players, or any other desired balancing. Other implementations also may be used.

In some embodiments, handicapping features may include determining the number of players on each team based on latency, player skill, and the like. For example, a first team having a latency (or skill) advantage over a second team may be limited to a smaller number of players than a team at a latency (or skill) disadvantage. As a specific example, a team with a latency of 10 ms to a game server may have only 10 players while a team with 100 ms latency may include 100 players. The teams may switch in alternating rounds or games (as noted above), so that the second team is limited to 10 players with a latency (or skill) advantage and the first team includes 100 disadvantaged players. Team totals may be calculated after an even number of rounds to determine an overall winner. Other parameters also may be used.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for managing latency in a networked competitive multiplayer game comprising a plurality of game clients and a game server, comprising:

a latency management server; and a software module for use on the latency management server comprising one or more processors and one or more memories, the software module including instructions stored on a non-transitory computer readable medium that:
  receive, from each of the plurality of game clients, network connectivity information indicating a response time between the latency management server and the corresponding game client;
  determine, by the latency management server, one or more target latencies based on the received network connectivity information;
  receive, from the game server, game data representative of in-game actions and track the in-game actions for each of the plurality of game clients;
  determine a player score for each of the plurality of game clients by applying a baseline scoring system to each of the in-game actions for each of the plurality of game clients;
  determine a weighted player score for each of the plurality of game clients by applying a respective coefficient to each of the player scores associated with the plurality of game clients;
  determine, by the latency management server, a latency adjustment for at least one of the plurality of game clients, each one of the latency adjustments including a wait time;
  receive, from a first game client of the plurality of game clients, game input intended for the game server;
  apply the determined wait time, if any, associated with the first game client to the game input;
  transmit, to the game server, the received game input.

2. The system of claim 1, where each coefficient is based on either the network connectivity information for the associated game client, a statistical deviation for in-game actions of a player associated with the game client, or both.

3. The system of claim 1, where the in-game actions comprise at least one selected from the group consisting of kills, headshots, and wins.

4. The system of claim 1, where at least one determined wait time is between about 5 ms and about 200 ms.

5. The system of claim 1, where the plurality of game clients are divided into at least two teams, where one of the at least two teams has a latency advantage over the other of the at least two teams.

6. The system of claim 5, where the latency advantage is defined by at least one determined wait time and the latency advantage is at least 10 ms.

7. A system for managing latency in a networked competitive multiplayer game comprising a plurality of game clients and a game server, comprising:
  a latency management server;
  a software module for use on the latency management server comprising one or more processors and one or more memories, the software module including instructions stored on a non-transitory computer readable medium that:
    receive, from each of the plurality of game clients, network connectivity information indicating a response time between the latency management server and the corresponding game client;
    determine, by the latency management server, one or more target latencies based on the received network connectivity information;
    determine, by the latency management server, a latency adjustment for at least one of the plurality of game clients, each one of the latency adjustments including a wait time;
    receive, from the game server, game data representative of in-game actions;
    determine a player score for each of the plurality of game clients by applying a baseline scoring system to each of the in-game actions for each of the plurality of game clients; and
    determine a weighted player score for each of the plurality of game clients by applying a respective coefficient to each of the player scores associated with the plurality of game clients.

8. The system of claim 7, where each coefficient is based on either the network connectivity information for the associated game client, a statistical deviation for the in-game actions of a player associated with the game client, or both.

9. The system of claim 7, where the in-game actions comprise at least one selected from the group consisting of kills, headshots, and wins.

* * * * *